(12) United States Patent
Soelberg

(10) Patent No.: US 10,933,313 B2
(45) Date of Patent: *Mar. 2, 2021

(54) PROGRAMMABLE ACTUATION INPUTS OF AN ACCESSORY AND METHODS THEREOF

(71) Applicant: STEELSERIES ApS, Frederiksberg (DK)

(72) Inventor: Tino Soelberg, Chicago, IL (US)

(73) Assignee: STEELSERIES ApS, Frederiksberg (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,999

(22) Filed: May 20, 2019

(65) Prior Publication Data
US 2019/0270002 A1 Sep. 5, 2019

Related U.S. Application Data

(63) Continuation of application No. 16/005,913, filed on Jun. 12, 2018, now Pat. No. 10,328,341, which is a
(Continued)

(51) Int. Cl.
*A63F 13/22* (2014.01)
*A63F 13/285* (2014.01)
(Continued)

(52) U.S. Cl.
CPC .............. *A63F 13/22* (2014.09); *A63F 13/24* (2014.09); *A63F 13/285* (2014.09); *A63F 13/42* (2014.09);
(Continued)

(58) Field of Classification Search
CPC ........... H03K 17/97; H03K 2017/9706; H03K 2017/9713; H03K 19/0021; A63F 13/21;
(Continued)

(56) References Cited

U.S. PATENT DOCUMENTS 2,995,727 A   8/1961  Quade et al.
3,412,264 A   11/1968 Preston
(Continued)

FOREIGN PATENT DOCUMENTS

WO    2020099668 A2    5/2020

OTHER PUBLICATIONS

"16.7 million colours: Cherry MX RGB Red Level," cherry.de [http://eheny.de/eid/index.html], 3 pgs., 2014.
(Continued)

*Primary Examiner* — Steven J Hylinski
(74) *Attorney, Agent, or Firm* — Guntin & Gust, PLC; Ralph Trementozzi

(57) ABSTRACT

A system that incorporates the subject disclosure may include, for example, a processor that performs operations including detecting a first depression range of a button that includes an electro-mechanical sensor for detecting the first depression range, comparing the first depression range to a first actuation threshold, and asserting a first actuation state when the first depression range is at or exceeds the first actuation threshold. Additional embodiments are disclosed.

20 Claims, 10 Drawing Sheets

Related U.S. Application Data continuation of application No. 14/303,784, filed on Jun. 13, 2014, now Pat. No. 10,022,622.

(60) Provisional application No. 61/982,081, filed on Apr. 21, 2014.

(51) Int. Cl.

| | |
|---|---|
| *G06F 3/01* | (2006.01) |
| *G06F 3/038* | (2013.01) |
| *A63F 13/24* | (2014.01) |
| *A63F 13/42* | (2014.01) |
| *G06F 1/16* | (2006.01) |
| *G06F 3/023* | (2006.01) |
| *G06F 3/0354* | (2013.01) |
| *G06F 3/039* | (2013.01) |
| *G06F 9/445* | (2018.01) |
| *G06F 13/10* | (2006.01) |
| *H01F 7/02* | (2006.01) |
| *A63F 13/60* | (2014.01) |
| *A63F 13/63* | (2014.01) |

(52) U.S. Cl.
CPC ............ *G06F 1/1652* (2013.01); *G06F 3/016* (2013.01); *G06F 3/023* (2013.01); *G06F 3/038* (2013.01); *G06F 3/0395* (2013.01); *G06F 3/03543* (2013.01); *G06F 9/44505* (2013.01); *G06F 13/102* (2013.01); *H01F 7/0273* (2013.01); *A63F 13/60* (2014.09); *A63F 13/63* (2014.09); *A63F 2300/1018* (2013.01); *A63F 2300/208* (2013.01); *G06F 2203/013* (2013.01)

(58) Field of Classification Search
CPC ................... A63F 13/22; A63F 13/218; A35F 2300/1018; A35F 2300/1056
See application file for complete search history.

(56) References Cited

U.S. PATENT DOCUMENTS

| | | |
|---|---|---|
| 3,846,758 A | 11/1974 | Gosset |
| 3,848,216 A | 11/1974 | Gamble et al. |
| 3,858,145 A | 12/1974 | Sulich et al. |
| 4,078,317 A | 3/1978 | Wheatley et al. |
| 4,203,093 A | 5/1980 | Edwards et al. |
| 4,268,814 A | 5/1981 | Henrion et al. |
| 4,366,463 A | 12/1982 | Barker |
| 4,459,578 A | 7/1984 | Sava et al. |
| 4,469,330 A | 9/1984 | Asher et al. |
| 4,489,303 A | 12/1984 | Martin et al. |
| 4,639,668 A | 1/1987 | Periot et al. |
| 5,160,918 A | 11/1992 | Barrette et al. |
| 5,359,163 A | 10/1994 | Woodard |
| 5,396,267 A | 3/1995 | Bouton et al. |
| 5,508,717 A | 4/1996 | Miller |
| 5,551,701 A | 9/1996 | Bouton et al. |
| 5,610,631 A | 3/1997 | Bouton et al. |
| 5,703,620 A | 12/1997 | Keyson |
| 5,704,836 A | 1/1998 | Norton et al. |
| 5,847,694 A | 12/1998 | Stern et al. |
| 6,053,814 A | 4/2000 | Pchenitchnikov et al. |
| 6,069,560 A | 5/2000 | Larsson et al. |
| 6,203,432 B1 | 3/2001 | Roberts et al. |
| 6,288,707 B1 | 9/2001 | Philipp et al. |
| 6,295,049 B1 | 9/2001 | Minner et al. |
| 6,424,336 B1 | 7/2002 | Armstrong et al. |
| 6,514,143 B1 | 2/2003 | Akazawa et al. |
| 6,664,989 B1 | 12/2003 | Snyder et al. |
| 6,935,956 B1 | 8/2005 | Tagawa et al. |
| 7,976,385 B2 | 7/2011 | Riggs et al. |
| 8,246,462 B1 | 8/2012 | Tran et al. |
| 8,480,491 B2 | 7/2013 | Ironmonger et al. |
| 8,777,620 B1 | 7/2014 | Baxter |
| 8,979,658 B1 | 3/2015 | Kulavik |
| 9,355,097 B2 | 5/2016 | Bortnik |
| 9,433,866 B2 | 9/2016 | Jacob et al. |
| 10,022,622 B2 | 7/2018 | Soelberg |
| 10,675,532 B2 * | 6/2020 | Soelberg ............... G06F 1/1652 |
| 2001/0009037 A1 | 7/2001 | Komata |
| 2001/0023203 A1 | 9/2001 | Chiu-Hao et al. |
| 2001/0039207 A1 | 11/2001 | Horigami et al. |
| 2002/0006823 A1 | 1/2002 | Horio |
| 2002/0055384 A1 | 5/2002 | Armstrong et al. |
| 2002/0128064 A1 | 9/2002 | Sobota et al. |
| 2004/0080494 A1 | 4/2004 | Fahlman et al. |
| 2004/0204242 A1 | 10/2004 | Cheng et al. |
| 2005/0124416 A1 | 6/2005 | Hammond et al. |
| 2005/0149467 A1 | 7/2005 | Ono et al. |
| 2005/0162389 A1 | 7/2005 | Obermeyer et al. |
| 2005/0270021 A1 | 12/2005 | Roessler et al. |
| 2006/0097453 A1 | 5/2006 | Feldman et al. |
| 2006/0234794 A1 | 10/2006 | Baseflug et al. |
| 2007/0171503 A1 | 7/2007 | Luo et al. |
| 2007/0227256 A1 | 10/2007 | Wright et al. |
| 2008/0001787 A1 | 1/2008 | Smith et al. |
| 2008/0009332 A1 | 1/2008 | Kake et al. |
| 2008/0009348 A1 | 1/2008 | Zalewski et al. |
| 2008/0266250 A1 | 10/2008 | Jacob |
| 2009/0085935 A1 | 4/2009 | Yamashita et al. |
| 2009/0258704 A1 | 10/2009 | Asami |
| 2010/0026635 A1 | 2/2010 | Dimitrov et al. |
| 2010/0173686 A1 | 7/2010 | Grant et al. |
| 2010/0194692 A1 | 8/2010 | Orr et al. |
| 2011/0141009 A1 | 6/2011 | Izumi |
| 2012/0119734 A1 | 5/2012 | Han et al. |
| 2012/0142418 A1 | 6/2012 | Muramatsu et al. |
| 2012/0319989 A1 | 12/2012 | Argiro et al. |
| 2013/0154992 A1 | 6/2013 | Nascimento et al. |
| 2013/0191625 A1 | 7/2013 | Mullens et al. |
| 2013/0222032 A1 | 8/2013 | Chou et al. |
| 2013/0324254 A1 | 12/2013 | Huang et al. |
| 2014/0015596 A1 | 1/2014 | Martin et al. |
| 2014/0101343 A1 | 4/2014 | Townsend et al. |
| 2014/0176441 A1* | 6/2014 | Casparian ........... G06F 3/03543 345/163 |
| 2014/0184496 A1 | 7/2014 | Gribetz et al. |
| 2014/0354070 A1 | 12/2014 | Watanabe |
| 2014/0364235 A1 | 12/2014 | Sugiyama |
| 2015/0130706 A1 | 5/2015 | Lacroix et al. |
| 2015/0130707 A1 | 5/2015 | Da Costa et al. |
| 2016/0124248 A1 | 5/2016 | Humphreys et al. |
| 2018/0290052 A1 | 10/2018 | Soelberg |
| 2019/0083882 A1 | 3/2019 | Soelberg et al. |
| 2020/0254334 A1 | 8/2020 | Soelberg et al. |

OTHER PUBLICATIONS

A1388-A1389: Linear Hall-Effect Sensor ICs with Analog Output Available in a Miniature, Low Profile Surface Mount Package, Allegro MicroSystems, 2 pgs. http://vwl.w.allag rorricro. comferYPrcxb:ls/Magnelic-Unear-And-Ang ular-Posilion-Senscr-1Csllinaar-Po.
"Hall Effect," http://en.wikipediaa-g/Wiki/Hall_elfect, 11 pgs., 2014.
"Keyboard Technology," http://en.wikipedia.org/widi/Keyboard_technology#Membrane_keyboard, 7 pgs. 2014.
"LDC1000 Inductance to Digital Converter," SNOSCX2A, Texas Instruments, 29 pgs., Sep. 2013.
"Hall-Effect IC Application Guide", Dec. 22, 2011, 1-37.
"Programmable Digital Hall Effect Sensor From Melexis Delivers Best in Class Performance, Size and Cost", Mar. 20, 2013, 1-4.
"Schmitt Trigger Using PLS153", Phillips Semiconductors Programmable Logic Devices, Sep. 1993, 18-21.
"Software User Manual MLX92232 PTC-04 Version 1.0", Melexis Microelectronic Integrated Systems, Mar. 3, 2013, 1-15.
Lewis, Mike , "Designing a Robust Input Handling System for Games", https://www.gamedev.net/articles/programming/general-and-gameplay-programming/designing-a-robust-input-handling-systemfor-games-r2975/, Mar. 19, 2013.

(56) References Cited

OTHER PUBLICATIONS

Magriff, Biff, "What is an analog face button?", https://gaming.stackexchange.com/questions/111863/what-is-an-analog-face-button, Mar. 28, 2013.
Wojslaw, Chick, "Progammable Schmitt Triggers Are Digitally Controlled", Electronic Design, Mar. 18, 2002, 1.
International Search Report & Written Opinion for PCT/EP2019/081561 dated Jun. 24, 2020.
"Metal Gear Solid 2—Sons of Liberty—Instruction Manual", URL:http://replacementdocs.com/download.php?view.3915, p. 35, XP055668151,, Jan. 11, 2006, 13 pp.
Jazzerman, "Metal Gear Solid 2: Dual Shock 2 analogue buttons", Tutorial : Overclockers UK Forums, Jun. 16, 2011, 4 pp.

\* cited by examiner

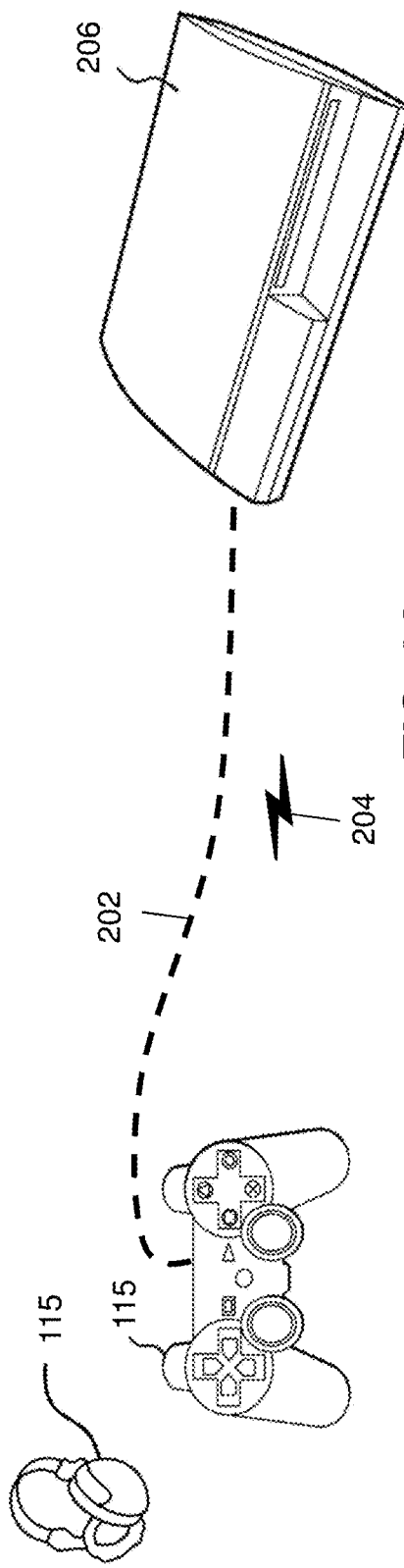
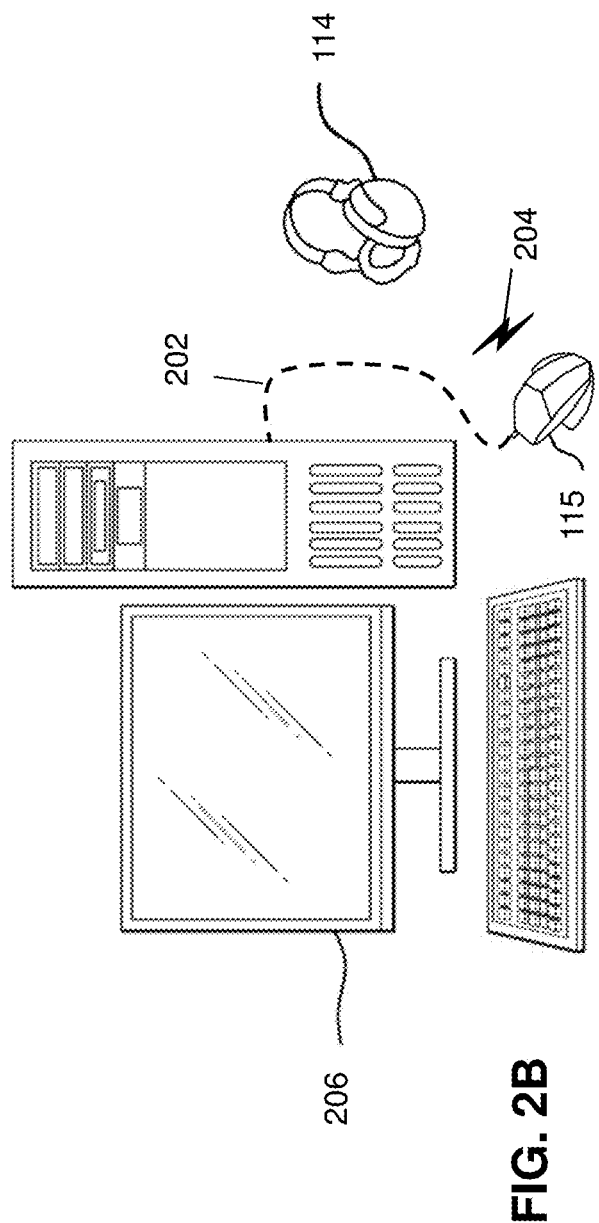
FIG. 2A
FIG. 2B

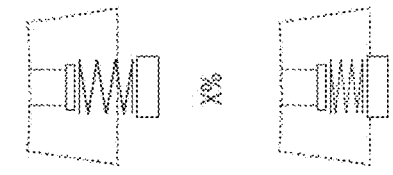
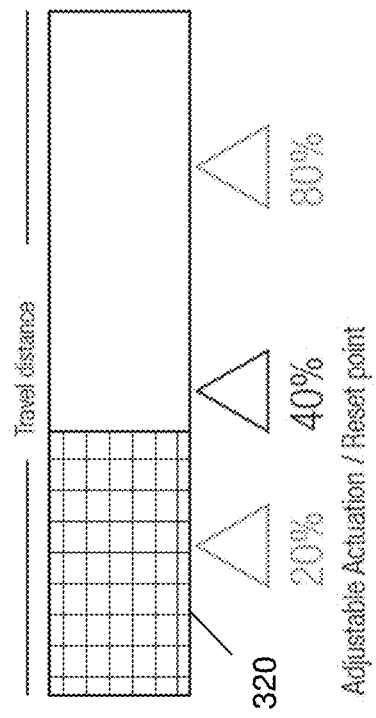
FIG. 3B
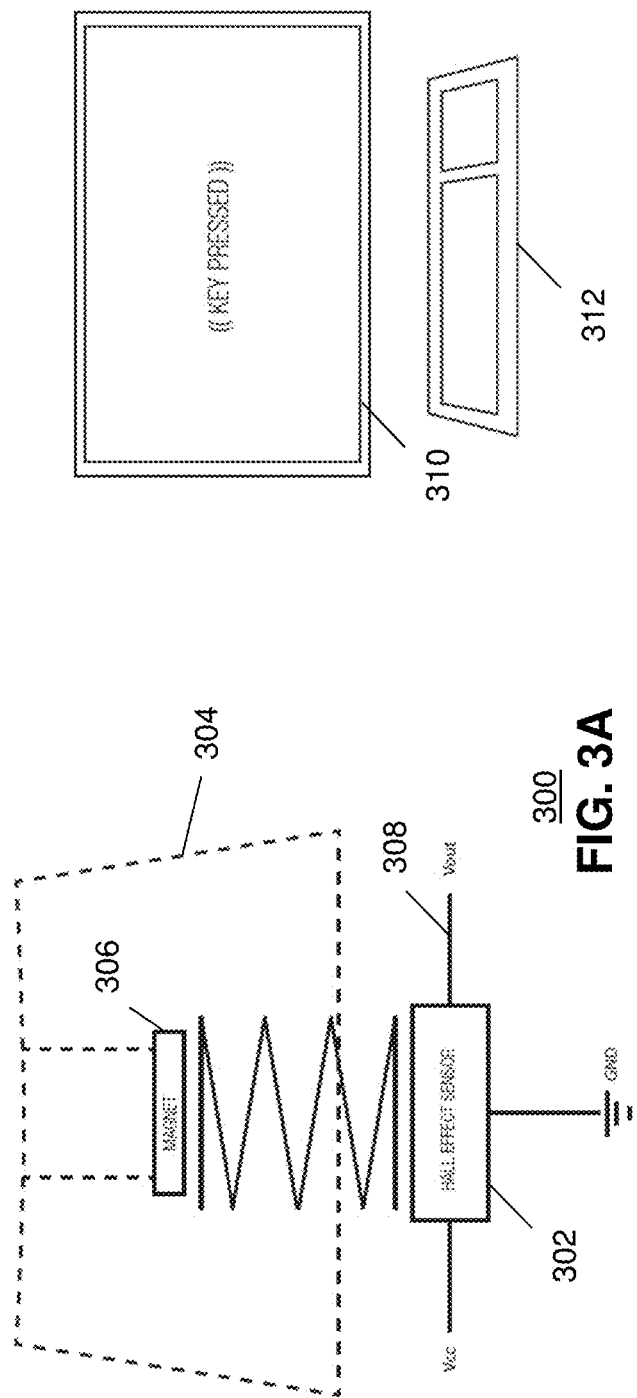
FIG. 3A
FIG. 3C

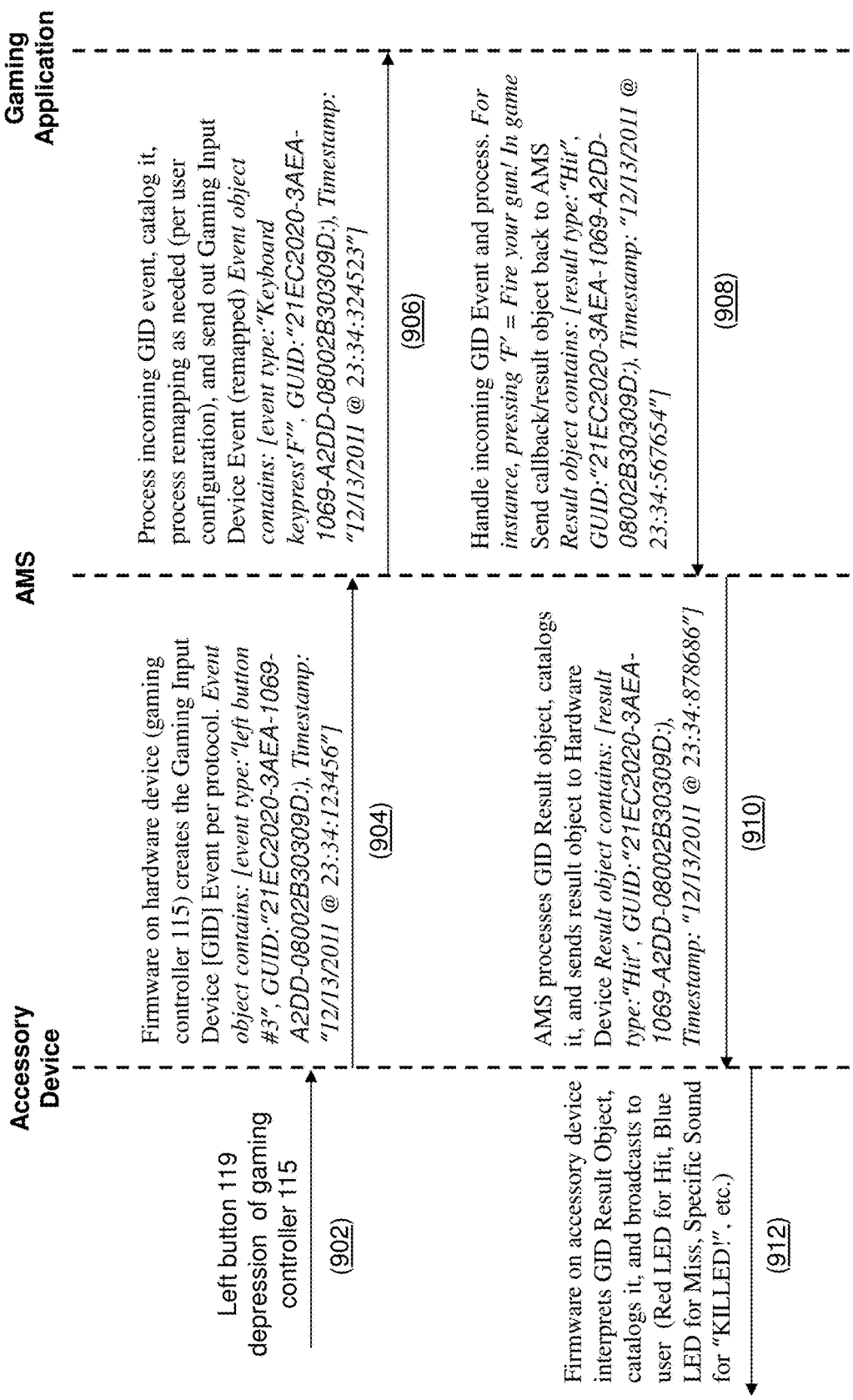

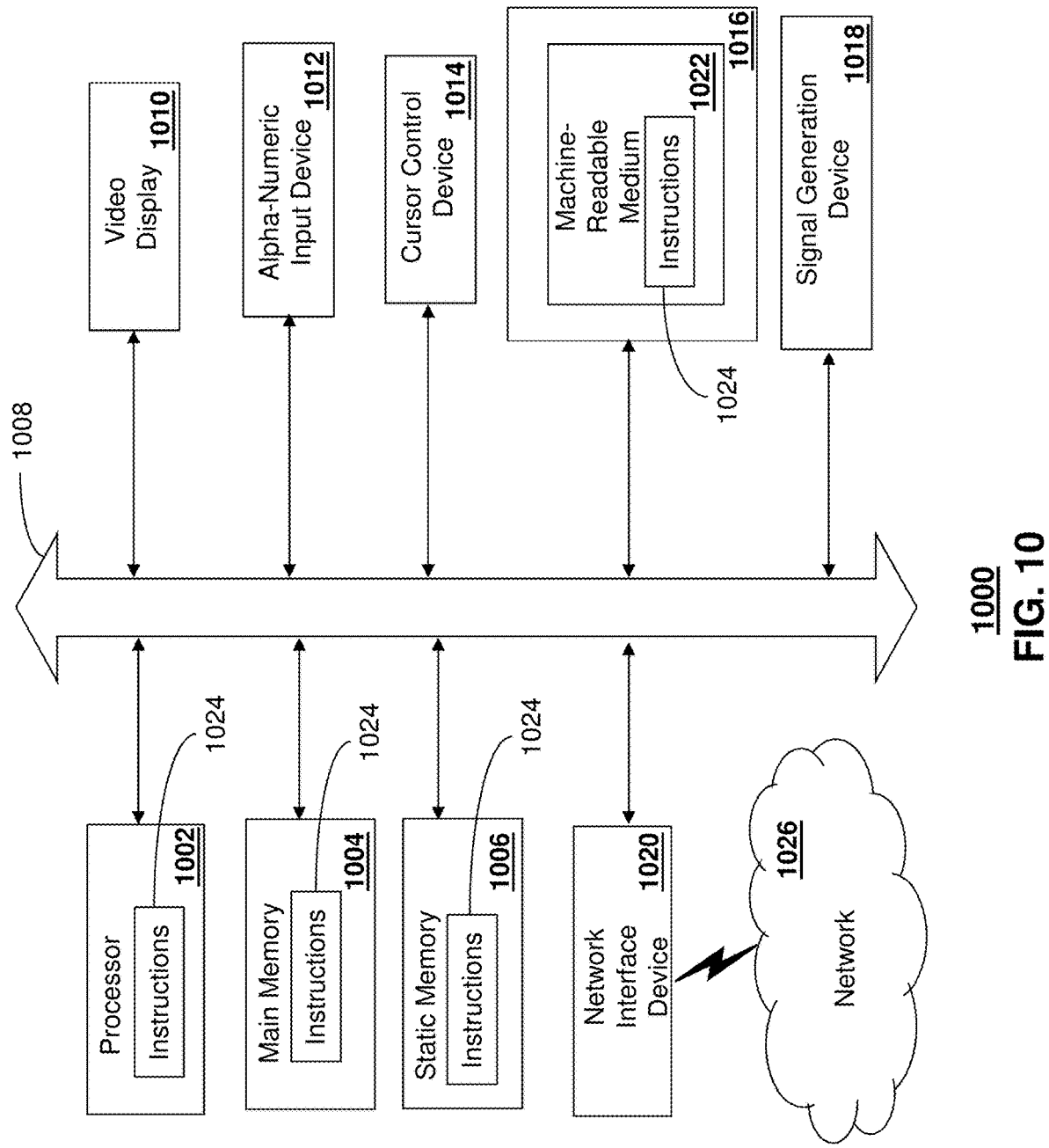

PROGRAMMABLE ACTUATION INPUTS OF AN ACCESSORY AND METHODS THEREOF

CROSS-REFERENCE TO RELATED APPLICATION(S)

This application is a continuation of U.S. patent application Ser. No. 16/005,913 filed Jun. 12, 2018, which is a continuation of U.S. patent application Ser. No. 14/303,784 filed Jun. 13, 2014 (now U.S. Pat. No. 10,022,622), which claims the benefit of priority to U.S. Provisional Application No. 61/982,081 filed Apr. 21, 2014, the disclosures of all of which are incorporated herein by reference in their entirety.

FIELD OF THE DISCLOSURE

The present disclosure relates generally to programmable actuation inputs of an accessory and methods thereof.

BACKGROUND

It is common today for gamers to utilize more than one gaming accessory. This is especially true of gamers who play on-line games or competitive games in a team or individual configuration. Gamers can have at their disposal accessories such as a keyboard, a general purpose gaming pad, a mouse, a gaming console controller, a headset to communicate with other players, a joystick, a computer console, or other common gaming accessories.

A gamer can frequently use a combination of these accessories in a single game (e.g., headset, a keyboard, and mouse). Efficient management and utilization of these accessories can frequently impact a gamer's ability to compete.

Accessory management can have utility in other disciplines which may not relate to gaming applications. Efficient use of accessories in these other disciplines can be important to other users.

BRIEF DESCRIPTION OF THE DRAWINGS

Reference will now be made to the accompanying drawings, which are not necessarily drawn to scale, and wherein:

FIG. 2A depicts an illustrative embodiment for communicatively coupling a gaming controller to a computing device;

FIG. 2B depicts an illustrative embodiment for communicatively coupling a gaming controller to a computing device;

FIG. 3A depicts an illustrative embodiment for a variable actuator device utilizing a magnet proximity sensor;

FIG. 3B depicts an illustrative embodiment for utilizing the variable actuator device of FIG. 3B in a keyboard communicatively coupled to a computing device;

FIG. 3C depicts an illustrative embodiment for tracking a depression range of the variable actuator device of FIG. 3A;

FIG. 9 depicts an illustrative embodiment of a communication flow diagram utilized by the system of FIG. 8; and FIG. 10 depicts an illustrative diagrammatic representation of a machine in the form of a computer system within which a set of instructions, when executed, may cause the machine to perform any one or more of the methodologies disclosed herein.

DETAILED DESCRIPTION

The subject disclosure describes, among other things, illustrative embodiments for variable actuator inputs and methods of application therefor. Other embodiments are described in the subject disclosure.

One embodiment of the subject disclosure includes a method for detecting a first depression range of a button that includes an electro-mechanical sensor for detecting the first depression range, comparing the first depression range to a first actuation threshold that is generated from user input, and asserting a first actuation state when the first depression range is at or exceeds the first actuation threshold.

One embodiment of the subject disclosure includes a machine-readable storage device having instructions stored therein, which when executed by a processor cause the processor to performs operations including receiving from a sensor of an accessory a signal that represents a depression range of a button, and providing the signal to a computing device to control aspects of a video game executed by the computing device.

One embodiment of the subject disclosure includes an accessory having a button comprising a sensor, a memory to store instructions, and a processor coupled to the memory and the button. Responsive to executing the instructions, the processor can perform operations including receiving from the sensor a signal that represents a depression range of the button, comparing the depression range to an actuation threshold, and transmitting to a computing device an actuation signal responsive to the depression range exceeding the actuation threshold.

Figure 1:
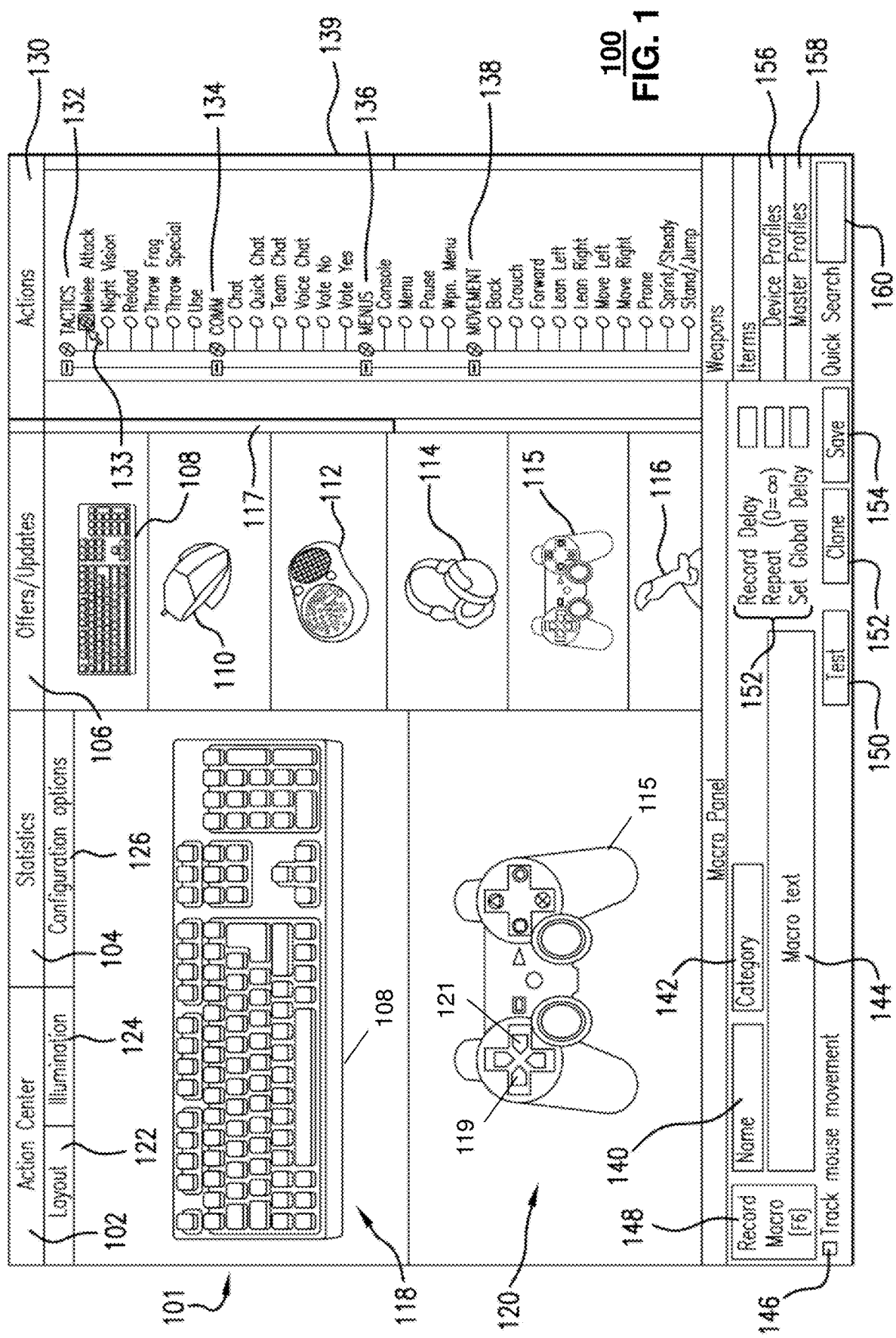
FIG. 1 depicts an illustrative embodiment of a Graphical User Interface (GUI) generated by an Accessory Management Software (AMS) application according to the present disclosure.

FIG. 1 depicts an illustrative embodiment of a Graphical User Interface (GUI) generated by an Accessory Management Software (AMS) application according to the present disclosure. The AMS application can be executed by a computing device such as a desktop computer, a laptop computer, a tablet, a server, a mainframe computer, a gaming console, a gaming accessory, or any combination or portions thereof. The AMS application can also be executed by portable computing devices such as a cellular phone, a personal digital assistant, or a media player. The AMS application can be executed by any device with suitable computing and communication resources.

FIG. 2A illustrates a number of embodiments for utilizing a gaming controller 115 with a computing device 206 in the form of a gaming console. In the illustration of FIG. 2A, the gaming controller 115 can be communicatively coupled to the gaming console 206 with a tethered cable interface 202 such as a USB or proprietary cable, or a wireless interface 204 such as WiFi, Bluetooth, ZigBee, or a proprietary wireless communications protocol. The cable interface 202 provides a means for communication that may be less susceptible to electromagnetic interference. It will be appreciated that the gaming controller 115 may further include a headset 114 (with or without a microphone not shown) utilized by a gamer to communicate with teammates and/or to listen to game sounds in high fidelity. In the illustration of FIG. 2A, the AMS application can in whole or in part be executed by the gaming controller 115, the gaming console 206, or a combination thereof.

FIG. 2B illustrates a number of other embodiments for utilizing a gaming controller 115 with a computing device 206. In this embodiment, the gaming controller 115 comprises a mouse and the computing device 206 comprises a computer. The gaming controller 115 can be tethered to the computing device 206 by a cable interface 202 (e.g., USB cable or proprietary cable) or a wireless interface 204. The cable interface 202 provides a means for communication that may be less susceptible to electromagnetic interference. It will be appreciated that the gaming controller 115 may further include a headset (with or without a microphone not shown) utilized by a gamer to communicate with teammates and/or to listen to game sounds in high fidelity. In the illustration of FIG. 2B, the AMS application can in whole or in part be executed by the gaming controller 115, the gaming console 206, or a combination thereof.

For illustration purposes, the terms gaming console 206 and computer 206 will be used hence forth interchangeably with the term computing device 206 with an understanding that a computing device 206 may represent a number of other devices such as a server, a tablet, a smart phone, and so on. Accordingly, a computing device 206 can represent any device with suitable computing resources to perform the methods described in the subject disclosure.

Typically, accessories with input buttons of variable shapes and sizes (e.g., button on a keyboard) work by attaching electronic switches connected in a matrix to a microprocessor that in turn reads the matrix and determines which switches are open and which are closed. The switches can come in a few different versions, the most common being a simple printed circuit board (PCB) that is configured to detect a button depression when a piece of conductive material of a switch mechanism makes contact with a contact pad of the PCB (e.g., rubber dome, membrane switches). Other implementations can include traditional mechanical electronic switches with copper blades that make contact when the switch is depressed.

Common with these switching technologies is that they are configured to have a fixed actuation point (AP) and a fixed reset point (RP). An actuation point can represent a switch transitioning from an open to closed position, and a reset point can represent the switch transitioning from a closed to open position. For rubber membrane actuation buttons, the AP occurs when the button is fully depressed, and the conductive material touches a contact point on a PCB, and likewise the RP occurs when the conductive material no longer makes contact with the contact point of the PCB. For mechanical type switches the AP can be configured at a location in the displacement range of the switch that is less than the full displacement range. As might be expected, the RP lies above their AP. Typically, the AP on a mechanical switch is about 2 mm, and the RP is around 1.6 mm. The foregoing embodiments illustrate that the above actuation and reset configurations effectively have actuation and reset points that provide binary stimuli (ON/OFF) to a computing device.

FIG. 3A depicts an illustrative embodiment for a variable actuator device 300 utilizing a magnet proximity sensor 302. The variable actuator device 300 does not use a traditional switch like a rubber membrane with conductive material or a mechanical switch that makes or breaks contact. Instead, the variable actuator device 300 can be constructed with a magnet proximity sensor 302, such as a Hall Effect sensor.

The Hall Effect sensor can measure a strength of a magnetic field generated by a magnet 306 in proximity to the magnetic proximity sensor 302. The magnetic proximity sensor 302 outputs a voltage level that corresponds to the strength of the magnetic field it senses from the magnet 306 as a spring-loaded button 304 holding the magnet 306 is depressed. A computing device 310 such as shown in FIG. 3B can be coupled to a keyboard 312 with all or some of its buttons utilizing the variable actuator device 300 of FIG. 3A. The signals 308 generated by multiple magnetic proximity sensors 302 can be can be processed by circuitry (e.g., analog to digital converter, etc.) of the keyboard 312 to convey to the computing device 310 which buttons have been depressed and the extent of the depression (X %). The information transmitted to the computing device 310 can be analog or digital signals representing the signal level provided by any particular magnetic proximity sensor 302 of the keyboard 312.

FIG. 3C depicts an illustrative embodiment for tracking a depression range of the variable actuator device 300 of FIG. 3A. The hash portion 320 can reflect the extent of depression, which the computing device 310 can determine from the signals received from the keyboard 312. The displacement range of a button depression can be tracked by the computing device 310 by translating the signal level of a specific button to a distance of travel. The computing device 310 can be configured, for example, to know a priori the full possible distance of travel of a button of the keyboard 312, how to translate a signal level from the magnetic proximity sensor 302 into a displacement distance (e.g., 1*mm* of travel for each mV of signal level), and thereby determine a degree of displacement of the button (e.g., 20%, 22%, 40%, etc.) relative to the full travel distance.

By having the ability determine a travel distance of the button of the keyboard 312, the computing device 310 can be configured to enable a user to define programmable thresholds for the actuation point (AP) and/or reset point (RP). For example, the computing device 310 can be configured by a user to set in one instance the AP at 60% and the RP at 75% of release. The computing device 310 can also be configured by a user to set multiple AP thresholds and multiple RP thresholds for a single button or multiple buttons, each threshold representing different actuation and reset states. The computing device 310 can be further configured by a user to utilize the AMS application as will be explained below to replace stimuli generated by the magnetic proximity sensor 302 with substitute stimuli supplied to software applications (e.g., a video game), to invoke a software application when an actuation state is detected, and/or perform other functions as will be described below.

It is noted that Hall Effect sensors are not necessarily the only option for measuring a depression level of variable actuator devices 300. Other suitable technologies that can perform a displacement measurement (e.g., inductive and capacitive sensors) can be used. It is further noted that the functions described above that can be performed by the computing device 310 can be delegated to a processor of the keyboard 312. Hence, a smart keyboard 312 can be adapted by a user to have programmable thresholds for AP and RP and to perform substitution functions of the AMS application as will be described below.

It is further noted that other accessories (e.g., mouse, gaming controller, joystick, smartphone with tactile keypad, navigation disk of a mobile device, etc.) can utilize the variable actuator device 300 of FIG. 3A. For example, the buttons of a mouse can be configured with variable actuator devices as described by the subject disclosure. Any of the buttons on a gaming controller (such as reference 115) of FIG. 2A can be configured with variable actuator devices as described by the subject disclosure. In sum, any device which can make use of a variable input function can utilize the variable actuator devices described by the subject disclosure. Any of the accessory devices described in the subject disclosure can also be adapted to utilize the variable actuator device 300 of FIG. 3A or a suitable substitute that performs a similar function.

Figure 4:
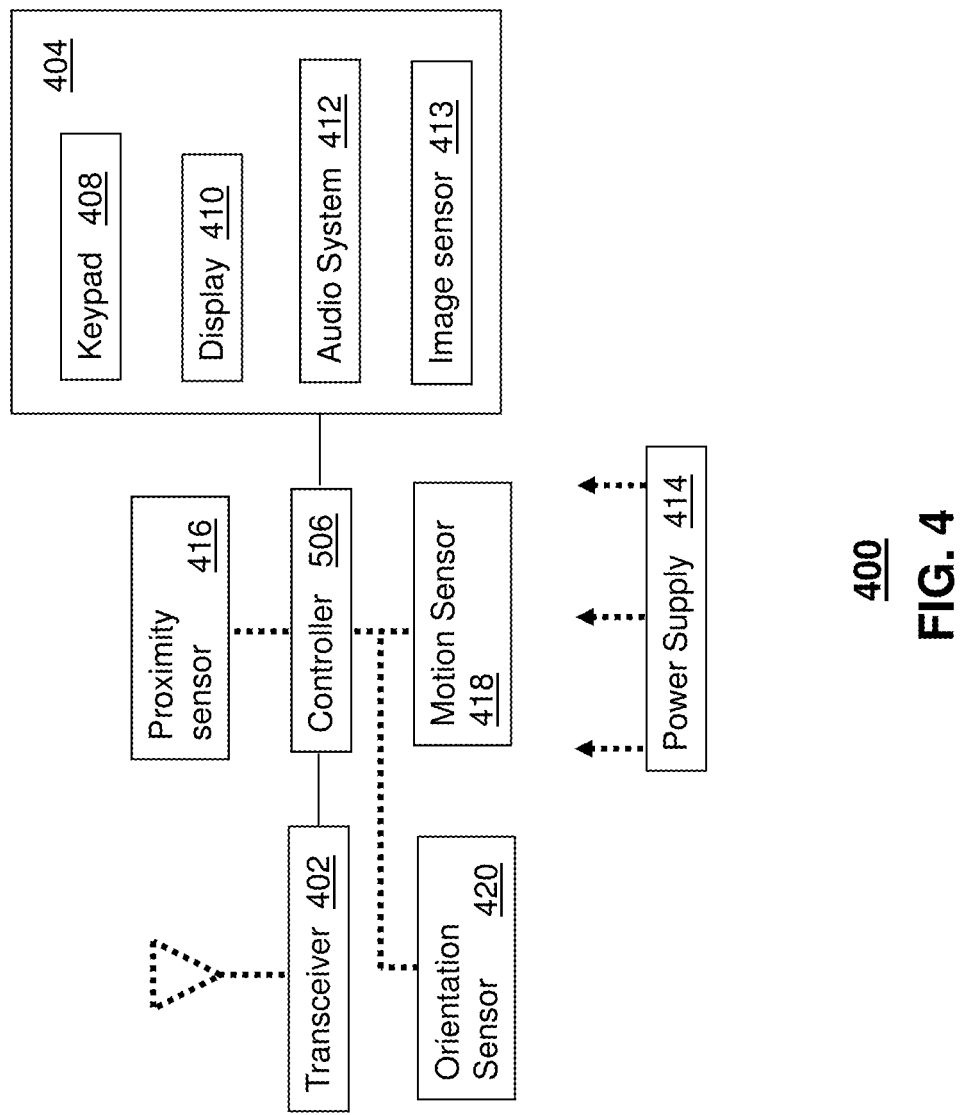
FIG. 4 depicts an illustrative embodiment of a communication device.

FIG. 4 depicts an illustrative embodiment of a communication device 400. Communication device 400 can serve in whole or in part as an illustrative embodiment of devices described in the subject disclosure. The communication device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 utilizes touch-sensitive technology, a portion or all of the keypad 408 can be presented by way of the display 410 with navigation features. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as a electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 as described herein can operate with more or less components described in FIG. 4 to accommodate the implementation of devices described by the subject disclosure. These variant embodiments are contemplated by the subject disclosure.

Figure 5:
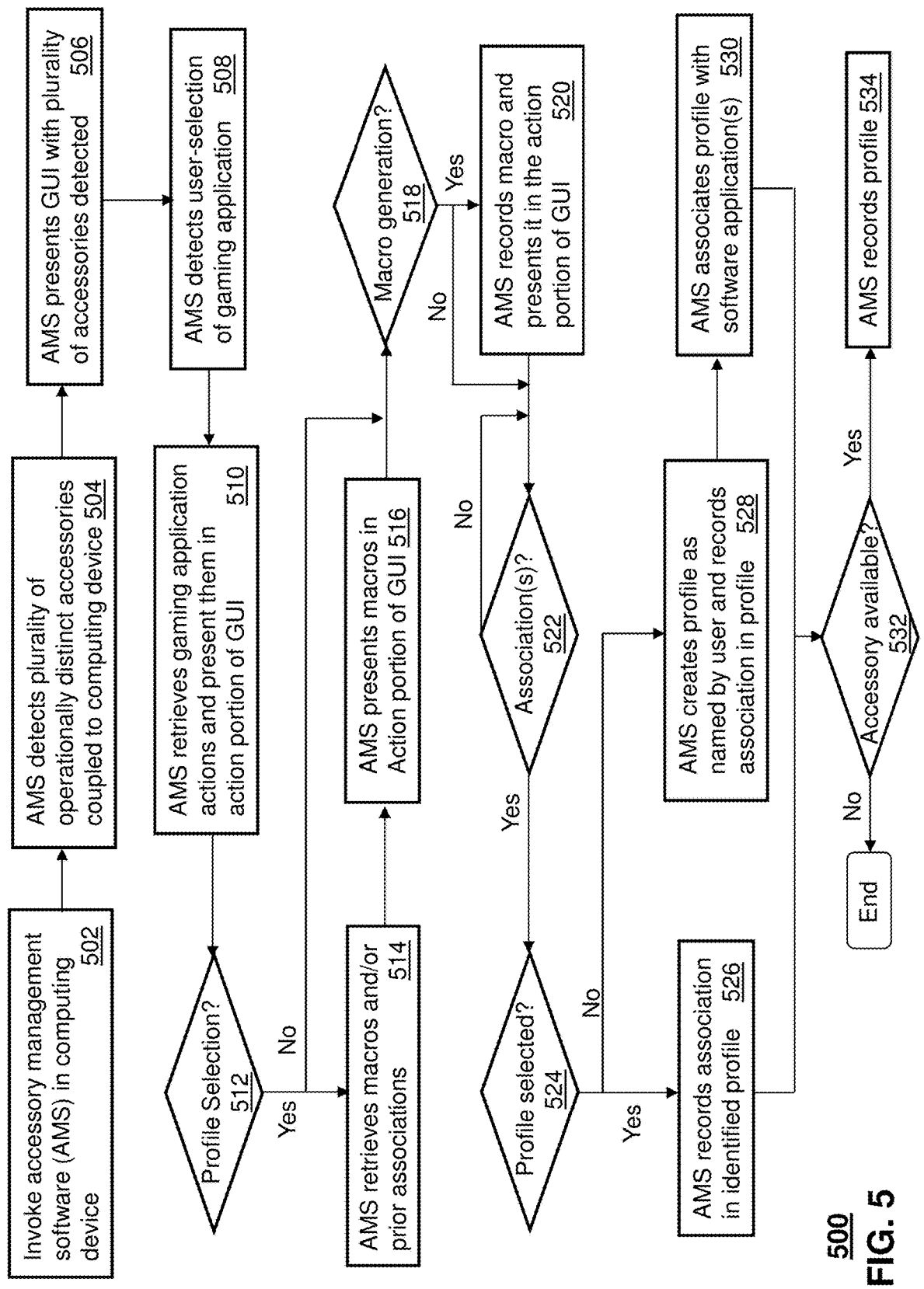
FIG. 5 depicts an illustrative embodiment of a first method utilized in the subject disclosure.
Figure 6:
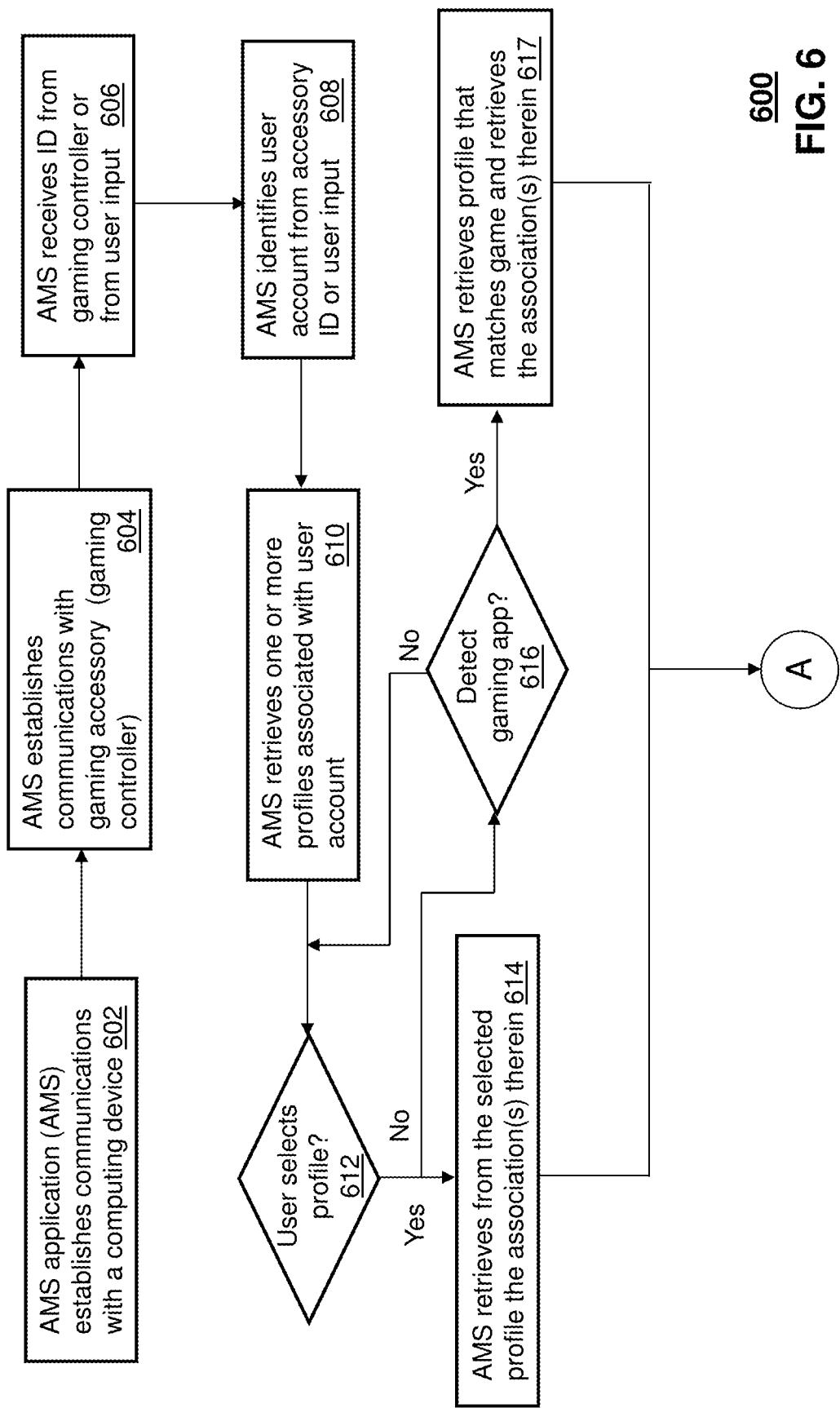
FIG. 6 depicts an illustrative embodiment of a second method utilized in the subject disclosure.
Figure 7:
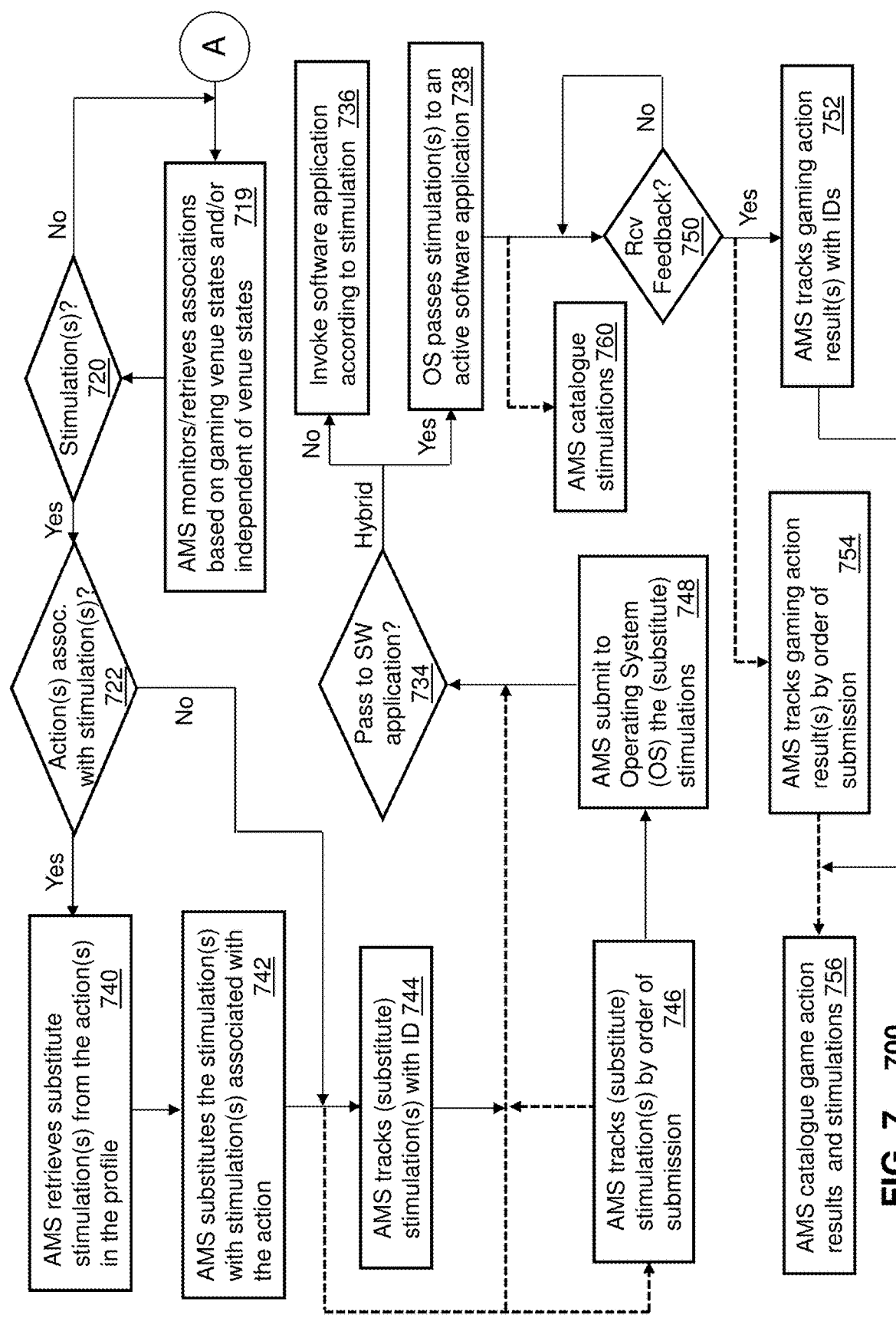
FIG. 7 depicts an illustrative embodiment of a third method utilized in the subject disclosure.

FIGS. 5-7 depict methods 500-700 describing illustrative embodiments of the AMS application. Method 500 can begin with step 502 in which the AMS application is invoked in a computing device. The computing device can be a remote server (not shown), the gaming console 206 or computer 206 of FIGS. 2-3, or any other computing device with suitable computing resources. The invocation step can result from a user selection of the AMS application from a menu or iconic symbol presented by the computing device 206, or when a user communicatively couples a gaming controller 115 or other form of accessory device with the computing device 206. In step 504, the AMS application can detect by way of software drivers in an operating system (OS) of the computing device 206 a plurality of operationally distinct accessories communicatively coupled to the computing device 206. The accessories can be coupled to the computing device 206 by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device 206 (or which can be an integral part of the computing device) and which can control aspects of the OS and/or a software application operating from the computing device 206. An accessory can represent for example a keyboard, a touch screen display, a gaming pad, a gaming controller, a mouse, a joystick, a microphone, or a headset with a microphone—just to mention a few.

In step 506, the AMS application presents a GUI 101 such as depicted in FIG. 1 depicting operationally distinct accessories such as a keyboard 108, and a gaming controller 115. The GUI 101 presents the accessories 108-116 in a scrollable section 117. One or more accessories can be selected by a user with a mouse pointer. In this illustration, the keyboard 108 and the gaming controller 115 were selected for customization. Upon selecting the keyboard 108 and the gaming controller 115 from the scrollable window of section 117, the AMS application presents the keyboard 108 and the gaming controller 115 in split windows 118, 120, respectively, to assist the user during the customization process.

In step 508, the AMS application can be programmed to detect a user-selection of a particular software application such as a video game. This step can be the result of the user entering in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable options of the gaming controller 115 to make an association with an input function of one of these accessories. Actions of one accessory can also be associated with another accessory that is of a different category. For example, key depressions "Ctrl A" of the keyboard 108 can be associated with one of the buttons of the gaming controller 115 (e.g., the left button 119).

In one embodiment, a Melee Attack action can be associated by dragging this action to either the left button 119 or right button 120 of the gaming controller 115. Thus, when the selected button is depressed, the stimulus signal that is generated by the selected button of the gaming controller 115 can be substituted by the AMS application with the Melee Attack action. In another embodiment, the AMS application can be configured so that the Melee Action can be associated with a combination of key button presses (e.g., simultaneous depression of the left and right buttons 119, 121, or a sequence of button depressions: two rapid left button depressions followed by a right button depression).

In yet another embodiment, the AMS application can be configured so that the Melee Action can be associated with movement of the gaming controller 115 such as, for example, rapid movement or shaking of the gaming controller 115. In a further embodiment, the AMS application can be adapted to make associations with two dimensional or three dimensional movements of the gaming controller 115 according to a gaming venue state. For example, suppose the player's avatar enters a fighter jet. In this gaming venue state, moving the left navigation knob forward can be associated by the AMS application with controlling the throttle of the jet engines. Rapidly moving the gaming controller 115 downward can represent release of munitions such as a bomb.

In a gaming venue state where the gamer's avatar has entered a building, lifting of the gaming controller 115 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can monitor gaming venue states by analyzing captured images produced by the gaming application (e.g., one or more still images of a tank, or a video of an avatar entering a tank), and/or by receiving messages from the gaming application by way of an application programming interface (API) thereby enabling the AMS application to identify the occurrence of a particular gaming venue state.

In yet another embodiment, the AMS application can be configured to create adaptable (programmable) AP and RP thresholds as described earlier in relation to FIGS. 3A-3C. The AMS application can set AP and RP thresholds to any level (far apart from each other, at the same threshold, and so on). Each AP threshold can also be associated with a substitute stimuli (e.g., stimuli associated with a Melee Attack action, a specific key sequence such Ctrl W, and so on), initiating a software application (e.g., team chat), and other suitable substitutes. The AMS application can also be configured to associate an RP threshold with substitute stimuli. In addition the AMS application can be configured to track changes in gaming venues and change the AP and RP thresholds or eliminate such thresholds when a particular gaming venue is detected. By eliminating AP and RP thresholds, the AMS application can utilize the signals supplied by the variable actuator device 300 to perform a joystick and/or a throttle function which can be applied to any software application such as a video game (e.g., accelerate or decelerate jet engines, helicopter engine, avatar from a crawl to a walk to a jog to a sprint, and vice-versa).

Additionally, the AMS application can be configured to change the sensitivity of signals received from a variable actuator device 300, much like adjusting a DPI parameter on a mouse, or adjusting the movement speed of a mouse pointer on a computer screen. The AMS application can, for example, adjust the sensitivity of signals supplied by the variable actuator device 300 so that it has a linear or non-linear translation that may be desirable to a user. The user can also define with the AMS application linear profiles, non-linear profiles, or combinations thereof which can be applied to signals received from the magnetic proximity sensors 302 of the variable actuator device 300 of FIG. 3A.

At step 512 the AMS application can also respond to a user selection of a profile. A profile can be a device profile or master profile invoked by selecting GUI button 156 or 158, each of which can identify the association of gaming actions with input functions of one or more accessories. If a profile selection is detected in step 512, the AMS application can retrieve in step 514 macro(s) and/or prior associations defined by the profile. The actions and/or macros defined in the profile can also be presented in step 516 by the AMS application in the actions column 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by the OS of the computing device 206, or any other recordable stimulus to initiate, control or manipulate software applications. For instance, a macro can represent a user entering the identity of a software application (e.g., instant messaging tool) to be initiated by the OS upon the AMS application detecting a speech command using speech recognition technology.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 115, recordable selections of buttons of the gaming controller 115, and so on. Macros can also be combinations of the above illustrations with selected actions from the Actions 130 menu. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 115, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 520. The recording step can be combined with a step for adding the macro to the associable items Actions column 130, thereby providing the user the means to associate the macro with input functions of the accessories (e.g., one or more keys of the keyboard 108, buttons of the gaming controller 115, etc.).

In step 522, the AMS application can respond to drag and drop associations of actions with input functions of the keyboard 108 or the gaming controller 115. Such associations can also be associated to an AP (or RP) threshold defined by a user for a particular input function of the keyboard 108. Associations can also be made based on the two or three dimensional movements of the gaming controller 115. If user input indicates that a user is performing an association, the AMS application can proceed to step 524 where it can determine if a profile has been identified in step 512 to record the association(s) detected. If a profile has been identified, the associations are recorded/stored in the profile in step 526. If a profile has not been identified in step 512, the AMS application can create a profile in step 528 for recording the detected associations. In the same step, the user can name the newly created profile as desired. The newly created profile can also be associated with one or more gaming software applications in step 530 for future reference. The AMS application can also record in a profile in step 526 associations based on gaming venue states. In this embodiment the same stimuli generated by the gaming controller 115 can result in different substitutions based on the gaming venue state detected by the AMS application.

Referring back to step 526, once the associations have been recorded in a profile, the AMS application can determine in step 532 which of the accessories shown illustratively in FIGS. 1-3 are programmable and available for programming. If the AMS application detects that an accessory (e.g., keyboard 108, gaming controller 115) is communicatively coupled to the computing device 206 and determines that the accessory is capable of performing stimulus substitutions locally, the AMS application can proceed to step 534 of FIG. 5 where it submits the profile and its contents for storage in the accessory (e.g., the gaming controller 115 in FIGS. 2-3). Once the accessory (e.g., the gaming controller 115) is programmed with the profile, the accessory can perform stimuli substitutions according to the associations recorded by the AMS application in the profile. Alternatively, the AMS application can store the profile in the computing device 206 of FIGS. 2-3 and perform substitutions of stimuli supplied by the gaming controller 115 according to associations recorded in the profile by the AMS application.

The GUI 101 of FIG. 1 presented by the AMS application can have other functions. For example, the GUI 101 can present a layout of the accessory (button 122), how the accessory is illuminated when associations between input functions and actions are made (button 124), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application as described in the subject disclosure. Selecting button 106 can also cause the AMS application to adapt the GUI 101 to present promotional offers and software updates.

The steps of method 500 in whole or in part can be repeated until a desirable pattern is achieved of associations between stimulus signals generated by accessories and substitute stimuli. It would be apparent to an artisan with ordinary skill in the art that there can be numerous other approaches to accomplish the embodiments described by method 500 or variants thereof. These undisclosed approaches are contemplated by the subject disclosure.

FIG. 6 depicts a method 600 for illustrating additional operations of the AMS application. In the configurations of FIGS. 2-3, the AMS application can be operating in whole or in part from the gaming controller 115, a gaming console 206, a computer 206, or a remote server (not shown). For illustration purposes, it is assumed the AMS application operates from the gaming console 206. Method 600 can begin with the AMS application establishing communications in steps 602 and 604 between the gaming console 206 and a gaming accessory such as the gaming controller 115, and a headset 114 such as shown in FIG. 1. These steps can represent for example a user starting the AMS application from the gaming console 206 and/or the user inserting at a USB port of the gaming console 206 a connector of a USB cable tethered to the gaming controller 115, which invokes the AMS application. In step 606, the gaming controller 115 and/or headset 114 can in turn provide the AMS application one or more accessory ID's, or the user can provide by way of a keyboard or the gaming controller 115 user identification. With the accessory ID's, or user input the AMS application can identify in step 608 a user account associated with the gaming controller 115 and/or headset 114. In step 610, the AMS application can retrieve one or more profiles associated with the user account.

In step 612, the user can be presented by way of a display coupled to the gaming console 206 profiles available to the user to choose from. If the user makes a selection, the AMS application proceeds to step 614 where it retrieves from the selected profiles the association(s) stored therein. If a selection is not made, the AMS application can proceed to step 616 where it can determine whether a software gaming application (e.g., video game) is operating from the gaming console 206 or whether the gaming console 206 is communicating with the software gaming application by way of a remote system communicatively coupled to the gaming console 206 (e.g., on-line gaming server(s) presenting, for example, World of Warcraft™). If a gaming software application is detected, the AMS application proceeds to step 617 where it retrieves a profile that matches the gaming application detected and the association(s) contained in the profile. As noted earlier, association(s) can represent accessory stimulations, navigation, speech, the invocation of other software applications, macros or other suitable associations that result in substitute stimulations. The accessory stimulations can be stimulations that are generated by the gaming controller 115, as well as stimulations from other accessories (e.g., headset 114), or combinations thereof.

Once a profile and its contents have been retrieved in either of steps 614 or step 617, the AMS application can proceed to step 719 of FIG. 7 where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank. The AMS application can retrieve in step 719 associations for the gaming controller 115 for controlling the tank.

The AMS application can process movements of the gaming controller 115 forwards, backwards, or sideways in two or three dimensions to control the tanks movement. The AMS application can remove AP and RP thresholds from the gaming controller 115 to change the use of variable actuator devices of the controller 115 to serve as a throttle or joystick. Similarly, rotating the gaming controller 115 or tilting the gaming controller 115 forward can cause an accelerometer, gyro or magnetometer of the gaming controller 115 to provide navigational data to the AMS application which can be substituted with an action to cause the tank to turn and/or move forward. The profile retrieved by the AMS application can indicate that the greater the forward tilt of the gaming controller 115, the greater the speed of the tank should be moving forward. Similarly, a rear tilt can generate navigation data that is substituted with a reverse motion and/or deceleration of the forward motion to stop or slow down the tank. A three dimensional lift of the mouse can cause the tank to steer according to the three dimensional navigation data provided by the gaming controller 115. For example, navigation data associated with a combination of a forward tilt and right bank of the gaming controller 115 can be substituted by the AMS application to cause an increase in forward speed of the tank with a turn to the right determined by the AMS application according to a degree of banking of the gaming controller 115 to the right. In the above embodiment, the three dimensional navigation data allows a gamer to control any directional vector of the tank including speed, direction, acceleration and deceleration.

In another illustration, the AMS application can detect a new gaming venue state as a result of the gamer directing the avatar to leave the tank and travel on foot. Once again the AMS application retrieves in step 719 associations related to the gaming venue state. In this embodiment, selection of buttons of the gaming controller 115 can be associated by the AMS application with weaponry selection, firing, reloading and so on. Similarly, the AMS application can reinstate AP and/or RP thresholds of variable actuator devices of the controller 115, which in turn can serve a different function in the new gaming venue. The movement of the gaming controller 115 in two or three dimensions can also control the direction of the avatar and/or selection or use of weaponry. Once the gaming venue state is detected in step 719, the AMS application retrieves the associations related to the venue state, and can perform substitutions of stimuli generated by the gaming controller 115, and/or speech commands received by microphone of the headset 114.

In one embodiment, the AMS application can be configured in step 719 to retrieve a profile that provides substitute stimuli for replacing certain stimuli generated by accessories. The associations recorded in the profile can be venue independent. In another embodiment, the AMS application can retrieve a combination of profiles, where one or more profiles provide substitute stimuli that are venue dependent and one or more other profiles provide substitute stimuli that are venue independent.

The AMS application can monitor in step 720 stimulations generated by the accessories coupled to the gaming console 206. The stimulations can be generated by the gamer by manipulating the gaming controller 115, and/or by generating speech commands detected by a microphone of the headset 114. If a stimulation is detected at step 720, the AMS application can determine in step 722 whether to forward the detected stimulation(s) to an Operating System (OS) of the gaming console 206 or the gaming application directly without substitutions. This determination can be made by comparing the detected stimulation(s) to corresponding associations in one or more profiles retrieved by the AMS application. If the detected stimulation(s) match the associations, then the AMS application proceeds to step 740 where it retrieves substitute stimulation(s) in the profile(s). In step 742, the AMS application can substitute the detected stimulation(s) with the substitute stimulations in the profile (s).

In one embodiment, the AMS application can track in step 744 the substitute stimulations by updating the stimulations with a unique identifier such as a globally unique identifier (GUID). In this embodiment, the AMS application can also add a time stamp to each substitute stimulation to track when the substitution was performed. In another embodiment, the AMS application can track each substitute stimulation according to its order of submission to the gaming application. For instance, sequence numbers can be generated for the substitute stimulations to track the order in which they were submitted to the gaming application. In this embodiment, the substitute stimulations do not need to be updated with sequence numbers or identifiers so long as the order of gaming action results submitted by the gaming application to the AMS application remain in the same order as the substitute stimulations were originally submitted.

For example, if a first stimulation sent to the gaming application by the AMS application is a command to shoot, and a second stimulation sent to the gaming application is a command to shoot again, then so long as the gaming application provides a first a game action result for the first shot, followed by a game action result for the second shot, then the substitute stimulations will not require updating with sequence numbers since the game action results are reported in the order that the stimulations were sent. If on the other hand, the game action results can be submitted out of order, then updating the stimulations with sequence numbers or another suitable identifier would be required to enable the AMS application to properly track and correlate stimulations and corresponding gaming action results.

Referring back to step 722, if the detected stimulation(s) do not match an association in the profile(s), then the AMS application proceeds to one of steps 744 or 746 in order to track the stimulations of the accessory as described above. In another embodiment, tracking of original stimulations or substitute stimulations can be bypassed by skipping steps 744 or 746 and proceeding to step 734.

Once the stimulations received in step 720 have been substituted with other stimulations at step 742 responsive to a detected association, or maintained unchanged responsive to detecting no association with substitute stimuli, and (optionally) the AMS application has chosen a proper tracking methodology for correlating gaming action results with stimulations, the AMS application can proceed to step 748 where it supplies to the OS of the computing device 206 a gaming action (i.e., one or more stimulations). The gaming action supplied to the OS at step 748 can be the unadulterated "original" gaming action of step 770, or an alternative gaming action generated by steps 794 or 796. At step 734, the OS determines whether to invoke in step 736 a software application identified in the stimulation(s) (e.g., gamer says "turn on team chat", which invokes a chat application), whether to forward the received stimulation(s) to the gaming software application in step 738, or combinations thereof. Step 734 may also represent a bypass of the OS whereby stimuli signals are directed to a software application of either steps 736 or 738.

Contemporaneous to the embodiments described above, the AMS application can monitor in step 750 for game action results supplied by the gaming application via API messages previously described. For instance, suppose the stimulation sent to the gaming application in step 738 is a command to shoot a pistol. The gaming application can determine that the shot fired resulted in a miss of a target or a hit. The gaming application can respond with a message which is submitted by way of the API to the AMS application that indicates the shot fired resulted in a miss or a hit. If IDs such as GUIDs were sent with each stimulation, the gaming application can submit game action results with their corresponding GUID to enable the AMS application to correlate the gaming action results with stimulations having the same GUID.

For example, if the command to shoot included the ID "1234", then the game action result indicating a miss will include the ID "1234", enabling the AMS application in step 752 to correlate the game action result to the stimulation having the same ID. If on other hand, the order of game action results can be maintained consistent with the order of the stimulations, then the AMS application can correlate in step 754 stimulations with game action results by the order in which stimulation were submitted and the order in which game action results are received. In step 756, the AMS application can catalogue stimulations and game action results. In another embodiment, the AMS application can be adapted to catalogue the stimulations in step 760. In this embodiment, step 760 can be performed as an alternative to steps 750 through 756. In another embodiment, step 760 can be performed in combination with steps 750 through 756 in order to generate a catalogue of stimulations, and a catalogue for gaming action results correlated to the stimulations.

Figure 8:
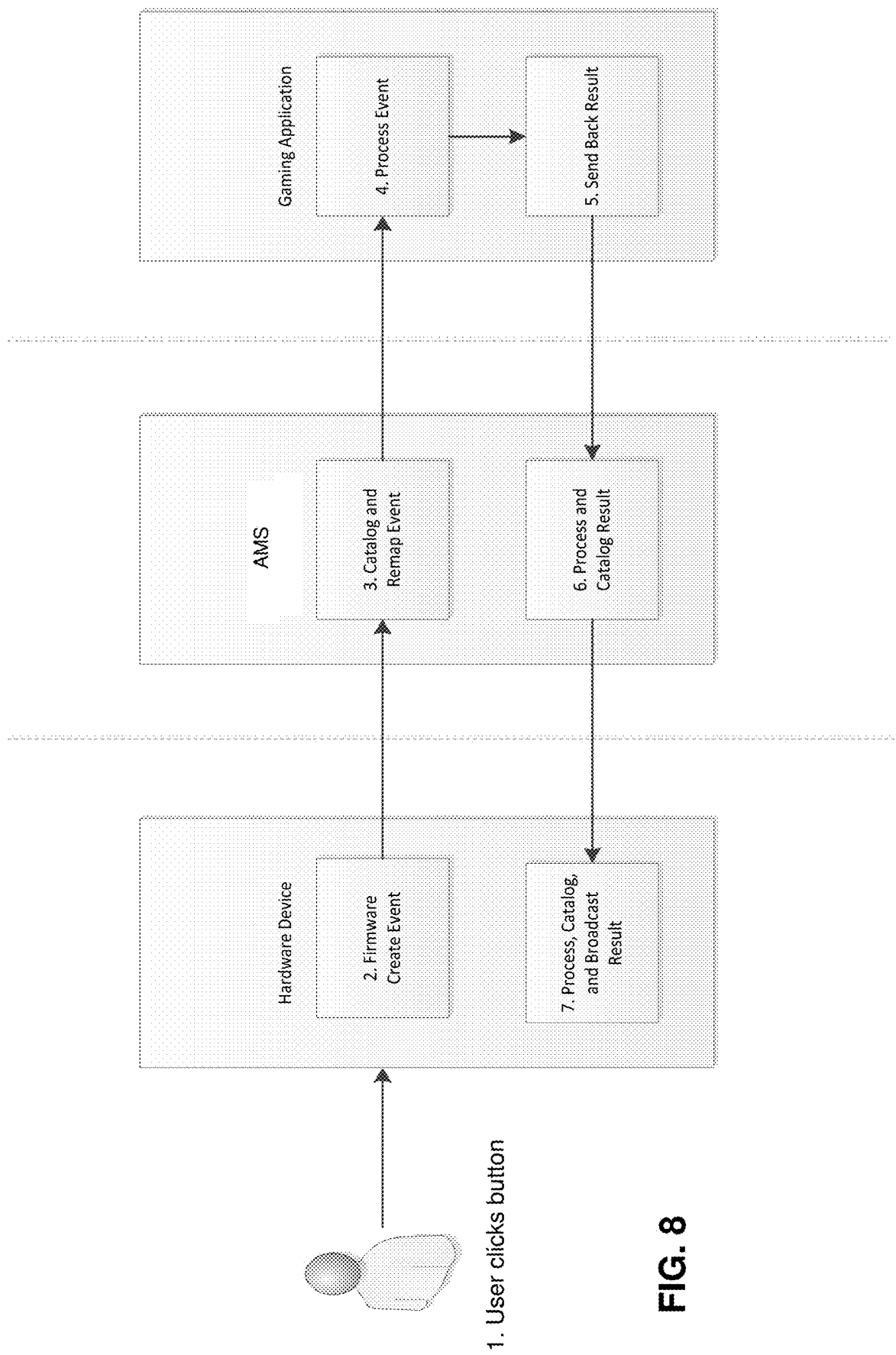
FIG. 8 depicts an illustrative embodiment of a system operating at least in part according to the methods of FIGS. 5-7.

FIGS. 8-9 illustrate embodiments of a system with a corresponding communication flow diagram for correlating stimulations and gaming action results. In this illustration a user clicks the left button 119 of the gaming controller 115. The gaming controller 115 can include firmware (or circuitry), which creates an event as depicted by event 2 in FIG. 8. The button depression and the event creation are depicted in FIG. 9 as steps 902 and 904. In step 904, the firmware of the gaming controller 115 can, for example, generate an event type "left button #3", and a unique GUID with a time stamp which is submitted to the AMS application. Referring back to FIG. 8, the AMS application catalogues event 3, and if a substitute stimulation has been predefined, remaps the event according to the substitution. The remapped event is then transmitted to the gaming application at event 4. Event 3 of FIG. 8 is depicted as step 906 in FIG. 9. In this illustration, the AMS application substitutes the left button #3 depression stimulus with a "keyboard 'F'" depression which can be interpreted by the gaming application as a fire command. The AMS application in this illustration continues to use the same GUID, but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 908 in FIG. 9. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" with a new time stamp, while utilizing the same GUID for tracking purposes. At step 910, the AMS application correlates the stimulation "left button #3 (and/or the substitute stimulation keyboard "F") to the game result "Hit" and catalogues them in memory. The AMS application then submits to the accessory (e.g., gaming controller 115) in step 910 the game action results "Hit" with the same GUID, and a new time stamp indicating when the result was received. Upon receiving the message from the AMS application, the accessory in step 912 processes the "Hit" by asserting a red LED on the accessory (e.g., left button 119 illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

Upon reviewing the aforementioned embodiments, it would be evident to an artisan with ordinary skill in the art that the embodiments of the subject disclosure can be modified, reduced, or enhanced without departing from the scope of the claims described below. For example, the AMS application can be executed from an accessory 115 or computing device 206 to perform the embodiments described in the subject disclosure. The AMS application can also be operated from a remote server ("cloud services"). In yet another embodiment, functions of the AMS application can be distributed between devices. In yet another embodiment, the AMS application can be configured to track the performance of a gamer and adapt a threshold as the gamer improves or declines in performance.

For instance, as a gamer's performance improves with a particular gaming action, the threshold associated with the gaming action can be adapted to be less sensitive in detecting an over usage state. Similarly, the sensitivity of the threshold can be increased to promptly identify an over usage state of a gaming action if the gamer's performance declines as a result of an over usage of the gaming action. Additionally, the AMS application can be adapted to add gaming actions to an exclusion table when the gamer's performance substantially improves as a result of using the gaming action being excluded. The exclusion table can also be changed by the AMS application by removing a gaming action from the exclusion table responsive to its excessive use causing a decline in a gamer's performance.

Other embodiments can be applied to the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as an accessory, computing device or combinations thereof. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method, comprising:
   determining, by a system comprising a processor according to analyzing of an image of a present video presentation from a gaming application, a venue state associated with a present game environment in the gaming application;

detecting, by the system, a depressing of a button of a gaming device, wherein the depressing of the button results in a first depression range followed by a second depression range;

comparing, by the system, the first depression range to a first actuation threshold of a plurality of actuation thresholds, wherein the first actuation threshold is based on the venue state;

asserting, by the system, a first actuation state when the first depression range satisfies the first actuation threshold;

comparing, by the system, the second depression range to a second actuation threshold of the plurality of actuation thresholds, wherein the second actuation threshold is based on the venue state; and asserting, by the system, a second actuation state when the second depression range satisfies the second actuation threshold, wherein the first and second actuation states correspond to different commands for the venue state.

2. The method of claim 1, wherein the asserting the first actuation state comprises transmitting first substitute stimuli to the gaming application.

3. The method of claim 2, wherein the first substitute stimuli is retrieved from a profile according to the venue state.

4. The method of claim 2, wherein the asserting the second actuation state comprises transmitting second substitute stimuli to the gaming application.

5. The method of claim 1, wherein the button comprises an electro-mechanical sensor for detecting the first depression range.

6. The method of claim 5, wherein the electro-mechanical sensor generates a voltage level proportional to a depression range of the button, and further comprising monitoring the venue state of the gaming application by tracking gaming options chosen by an operation of the gaming device.

7. The method of claim 1, wherein the analyzing the image comprises detecting an object in the present video presentation.

8. The method of claim 7, wherein the first depression range comprises a signal supplied by a sensor of the button.

9. The method of claim 1, further comprising:
detecting, by the system, a first release range of the button;
comparing, by the system, the first release range to a first reset threshold; and
asserting, by the system, a first reset state when the first release range satisfies the first reset threshold.

10. The method of claim 9, further comprising:
detecting, by the system, a second release range of the button;
comparing, by the system, the second release range to a second reset threshold; and
asserting, by the system, a second reset state when the second release range satisfies the second reset threshold.

11. The method of claim 1, further comprising receiving, by the system, a program setting for the first actuation threshold.

12. A machine-readable storage device, comprising instructions, wherein responsive to executing the instructions, a processor performs operations comprising:
determining a gaming venue state from a gaming application executing on a computing device based on a present gaming environment in the gaming application by a software application executing on the computing device to control aspects of the gaming application;

receiving a signal from a sensor of an accessory that represents a depression range of a button, wherein the software application accesses a plurality of actuation thresholds for the gaming venue state according to different commands for the gaming venue state; and providing the signal to the software application, wherein the software application causes a first actuation threshold of the plurality of actuation thresholds to be changed to a second actuation threshold of the plurality of actuation thresholds in accordance with a change in the gaming venue state.

13. The machine-readable storage device of claim 12, wherein the gaming application performs an image analysis of a video presentation by the gaming application.

14. The machine-readable storage device of claim 13, wherein the image analysis comprises:
detecting a first object and a second object in the video presentation; and
detecting a motion of the first object relative to the second object in the video presentation.

15. The machine-readable storage device of claim 12, wherein the signal comprises an analog signal or a digital signal.

16. The machine-readable storage device of claim 15, wherein the operations further comprise receiving instructions to change the second actuation threshold to a new actuation threshold of the plurality of actuation thresholds for detecting the new actuation threshold for a different depression range of the button, responsive to another change in the gaming venue state, and wherein the different depression range is compared with the first actuation threshold of the plurality of actuation thresholds.

17. An accessory, comprising:
a button comprising a sensor;
a memory to store instructions; and
a processor coupled to the memory and the button, wherein responsive to executing the instructions, the processor performs operations comprising:
receiving venue information from an accessory management application being executed on a computing device of a gaming application being executed on the computing device, wherein the accessory management application determines the venue information based on an image analysis of a video presentation of the gaming application to determine a venue state based on a present game environment in the video presentation;
determining an actuation threshold of a plurality of actuation thresholds for the venue state according to different commands for the venue state;
comparing an input from the sensor to the actuation threshold; and
transmitting an actuation signal to the accessory management application responsive to the input exceeding the actuation threshold, wherein the accessory management application causes the actuation threshold to be changed in accordance with the venue state.

18. The accessory of claim 17, wherein the image analysis is based on detecting motion of objects relative to each other in the video presentation.

19. The accessory of claim 17, wherein the sensor generates a voltage level proportional to a depression range of the button, and wherein the receiving the venue information further comprises receiving gaming options chosen by an operation of the gaming application.

20. The accessory of claim 19, wherein the button comprises an electro-mechanical sensor for detecting the depression range of the input.

* * * * *